J. B. McDEVITT.
VALVE FOR GASOLENE TANKS.
APPLICATION FILED MAR. 20, 1913.
1,095,016.
Patented Apr. 28, 1914.
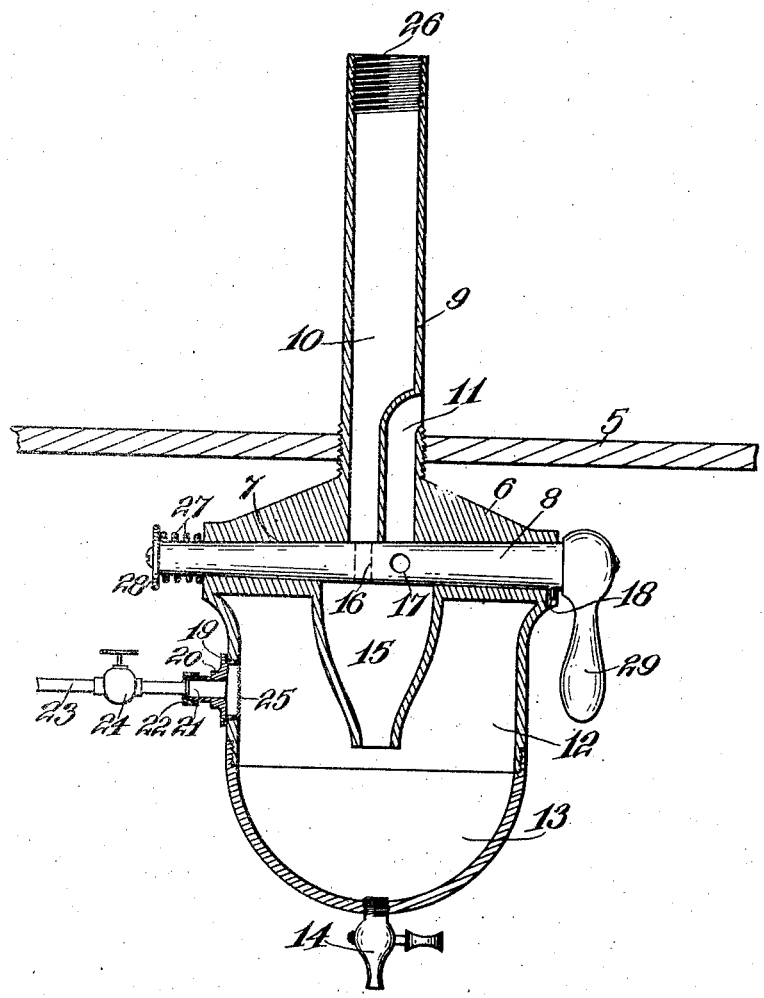
Witnesses
Inventor
James B. McDevitt.
Attorney

UNITED STATES PATENT OFFICE.

JAMES B. McDEVITT, OF CHICAGO, ILLINOIS, ASSIGNOR OF ONE-HALF TO BENDT F. N. BENDTSEN, OF CHICAGO, ILLINOIS.

VALVE FOR GASOLENE-TANKS.

1,095,016. Specification of Letters Patent. Patented Apr. 28, 1914.

Application filed March 20, 1913. Serial No. 755,701.

*To all whom it may concern:*

Be it known that I, JAMES B. McDEVITT, a citizen of the United States, residing at Chicago, in the county of Cook and State of Illinois, have invented certain new and useful Improvements in Valves for Gasolene-Tanks, of which the following is a specification.

The valve which is the subject of the present invention is designed for use in connection with gasolene tanks carried on motor vehicles, and its main object is to provide an improved valve mechanism whereby the driver of the car may be warned of the condition of the gasolene supply before the latter is entirely exhausted, the mechanism being constructed so that the feed of the gasolene is limited to a predetermined depth, after which no more gasolene will flow to the carbureter, thus giving the driver notice that the fuel supply is low and that replenishment is necessary, and also to allow the feed of the remaining contents of the tank. The normal supply of gasolene to the carbureter is taken from the tank some distance above the bottom thereof, so that a supply of pure gasolene is assured, the water, solid matter and other impurities settling in that portion of the tank which is below the level from which the normal supply is obtained.

Other objects and advantages of the invention will be pointed out in the detailed description appearing hereinafter, reference being had to the accompanying drawing in which a vertical section of a fragment of the tank and the valve mechanism is shown.

Referring specifically to the drawing, 5 denotes the bottom of a tank such as is used on motor vehicles for holding the supply of gasolene which is employed as the engine fuel. To said tank bottom is connected a valve casing having a solid body portion 6 provided with a transverse bore 7 in which a valve plug 8 seats. From the top of the body portion rises a stem 9 which is threaded at its base so that it may be screwed into a hole in the tank bottom, from which latter it extends into the tank and rises a suitable distance from the bottom thereof. The stem 9 has a longitudinal channel 10 extending throughout its entire length, the upper end of said channel opening through the corresponding end of the stem. The channel is continued through the body portion of the valve casing up to the bore 7. In the stem 9 is also a second channel 11 extending parallel to the channel 10 but opening through the side of the stem at the tank bottom. This channel 11 also extends to the bore 7.

Below the body portion 6, the valve casing is formed with a cup 12 having a removable bottom portion 13 provided with a drain valve 14.

From the body portion 6 an outlet nozzle 15 extends into the cup 12, said nozzle being in alinement with the channels 10 and 11 and extending from the bore 7.

The plug 8 is an ordinary tapered turning plug having transverse ways 16 and 17 respectively arranged at a right angle to each other. The way 16 is adapted to register with the channel 10 and the way 17 with the channel 11. Both ways are adapted to register with the nozzle 15. Thus, when the plug is turned to bring the way 16 in alinement with the channel 10, the channel 11 is shut off and gasolene flows from the tank by the way of the channel 10 and the nozzle 15 into the cup 12. When the plug is turned to place the way 17 in alinement with the channel 11, the channel 10 is shut off, and gasolene flows from the tank by the way of the channel 11 and the nozzle 15 into the cup 12. The valve plug has a stop 18 similar to the stop employed in connection with gas cocks, to prevent the plug from being turned more than a quarter revolution. The diameter of the ways 16 and 17 is less than that of the channels 10 and 11, so as to allow alinement with the latter if the plug should wear in the direction of its length.

In the side of the cup 12, above the bottom thereof and the mouth of the nozzle 15, is an opening into which is screwed a cap 19 having on its outer face an angular portion 20 to facilitate the application of a wrench, and a nipple 21 to which is connected, by means of an ordinary coupling sleeve 22, a pipe 23 leading to the carbureter (not shown). The pipe 23 is provided with a valve 24. The inner portion of the cap 19 carries a screen 25 to exclude solid matter and other impurities from the pipe 23.

The gasolene which is discharged from the tank into the cup 12, flows out of the same through the cap 19 and is carried by the pipe 23 to the carbureter. Inasmuch as the outlet of the cup is above the bottom thereof, impurities have a chance to settle and will not pass through the outlet. If any impurities should rise to the outlet, the screen 25 will prevent their entrance into the pipe 23, and as the screen is vertical such impurities will slide down the same and drop back to the bottom of the cup.

The cup 12 can be easily cleaned by removing the bottom portion 13.

If there is any tendency of the ways 16 and 17 to clog they may be flushed out by the pressure in the tank upon operating the valve plug 8.

The valve plug 8 is held wedged to its seat by a spring 27 coiled around one projecting end between a cap 28 and the corresponding side of the body portion 6 of the valve casing. The other end of the valve plug has a handle 29.

It will be evident from the foregoing that a supply of pure gasolene to the carbureter is assured, and the driver is also warned when the gasolene level is getting low. In use, the valve plug 8 will be turned to shut off the channel 11 and to open the channel 10. Thus, the gasolene continues to flow until its level reaches the upper end of the stem 9, and the flow will then cease. If a supply to replenish the tank is not at hand, the driver then turns the valve plug so as to open the channel 11, whereupon the gasolene continues to flow from the tank until the latter is empty, thus giving the driver time to run the car to a place where a new supply of gasolene may be obtained.

I claim:

The combination with a tank; of a valve casing connected thereto and comprising a solid body portion having a transverse bore and an outlet nozzle depending therefrom, said body portion having a stem extending into the tank, said stem having channels the inlet ends of which are at different levels in the tank, a cup extending from the body portion, into which cup the nozzle discharges, said cup having an outlet, and a rotatable valve plug in the aforesaid bore, said valve plug having transverse ways which are alternately in alinement with the aforesaid channels to open the same to the nozzle, one channel being closed when the other channel is open, and vice versa.

In testimony whereof I affix my signature in presence of two witnesses.

JAMES B. McDEVITT.

Witnesses:
B. F. N. BENDTSEN,
H. G. BATCHELOR.